United States Patent
Chai et al.

(10) Patent No.: US 11,356,172 B2
(45) Date of Patent: Jun. 7, 2022

(54) UNMANNED AERIAL VEHICLE NETWORK

(71) Applicant: NEC Laboratories America, Inc., Princeton, NJ (US)

(72) Inventors: Eugene Chai, Monmouth Junction, NJ (US); Sampath Rangarajan, Bridgewater, NJ (US); Karthikeyan Sundaresan, Manalapan, NJ (US); Ramanujan Sheshadri, Lawrence Township, NJ (US)

(73) Assignee: NEC Corporation

( * ) Notice: Subject to any disclaimer, the term of this patent is extended or adjusted under 35 U.S.C. 154(b) by 156 days.

(21) Appl. No.: 16/816,605

(22) Filed: Mar. 12, 2020

(65) Prior Publication Data

US 2022/0103246 A1    Mar. 31, 2022

Related U.S. Application Data

(60) Provisional application No. 62/819,578, filed on Mar. 16, 2019.

(51) Int. Cl.
*H04B 7/185* (2006.01)
*H04W 92/24* (2009.01)
*H04W 4/40* (2018.01)

(52) U.S. Cl.
CPC ..... *H04B 7/18584* (2013.01); *H04B 7/18504* (2013.01); *H04W 4/40* (2018.02); *H04W 92/24* (2013.01)

(58) Field of Classification Search
CPC ........... H04B 7/18584; H04B 7/18504; H04W 4/40; H04W 92/24

USPC ......................................... 370/329
See application file for complete search history.

(56) References Cited

U.S. PATENT DOCUMENTS

| | | | | |
|---|---|---|---|---|
| 2016/0027307 | A1* | 1/2016 | Abhyanker | G06Q 50/01 701/117 |
| 2019/0045580 | A1* | 2/2019 | Chai | H04W 92/02 |
| 2019/0086938 | A1* | 3/2019 | Shattil | G05D 1/104 |
| 2019/0260462 | A1* | 8/2019 | Axmon | H04B 7/2041 |

OTHER PUBLICATIONS

Ramo et al., "Characterizing Multihop Aerial Networks of COTS Multirotors", IEEE Transactions on Industrial Informatics, Apr. 2017, vol. 13, No. 2, pp. 898-906.

Guillen-Perez et al., "Flying Ad Hoc Networks: A New Domain for Network Communications", Sensors MDPI, Oct. 2018, pp. 1-23.

* cited by examiner

*Primary Examiner* — Kwang B Yao
*Assistant Examiner* — Syed M Bokhari
(74) *Attorney, Agent, or Firm* — Joseph Kolodka (57) ABSTRACT

Systems and methods implementing a multi-unmanned aerial vehicle (UAV) wireless communication network are provided. The system includes application UAVs that wirelessly provide applications. The system includes relay UAVs that connect the application UAVs to a ground station. The ground station connects to a wireless backhaul network. Processor devices determine mobility for the application UAVs based on application-specific objectives. The processor devices also determine mobility for the relay UAVs based on forming and maintaining the wireless backhaul network.

16 Claims, 9 Drawing Sheets

Deploy self-organizing multi-UAV network including ground station, relay UAVs and application UAVs
910

↓

Implement process for optimal position, yaw and traffic routing across UAVs
920

↓

Implement optimal process for fast backhaul re-configuration
930

FIG. 9

UNMANNED AERIAL VEHICLE NETWORK

RELATED APPLICATION INFORMATION

This application claims priority to U.S. Provisional Patent Application No. 62/819,578, filed on Mar. 16, 2019, incorporated herein by reference herein its entirety.

BACKGROUND

Technical Field

The present invention relates to unmanned aerial vehicles and more particularly to networks of unmanned aerial vehicles.

Description of the Related Art

Unmanned aerial vehicles (UAVs) are aircraft that do not have an onboard human pilot. UAVs can be included, along with a ground-based controller, in an unmanned aircraft system. The UAV and ground-based controller can communicate with a wireless communications system.

SUMMARY

According to an aspect of the present principles, a system is provided for implementing a multi-unmanned aerial vehicle (UAV) wireless communication network. The system includes application UAVs that wirelessly provide applications. The system includes relay UAVs that connect the application UAVs to a ground station. The ground station connects to a wireless backhaul network. Processor devices determine mobility for the application UAVs based on application-specific objectives. The processor devices also determine mobility for the relay UAVs based on forming and maintaining the wireless backhaul network.

According to another aspect of the present principles, another system is provided for implementing a multi-unmanned aerial vehicle (UAV) wireless communication network. The system includes application UAVs that wirelessly provide applications. The system includes relay UAVs that connect the application UAVs to a ground station. The ground station connects to a millimeter wave spectrum (mmWave) backhaul network. Processor devices determine mobility for the application UAVs based on application-specific objectives that include high bandwidth communications and high-resolution sensing. The processor devices also determine mobility for the relay UAVs based on forming and maintaining the mmWave mesh backhaul network.

According to another aspect of the present principles, a multi-unmanned aerial vehicle (UAV) wireless communication network is provided. The multi-UAV network includes a wireless backhaul network. The wireless backhaul network can be implemented by a multiple relay UAVs and application UAVs. The mobility for the application UAVs is determined based on application-specific objectives. The application UAVs can wirelessly provide applications. The mobility for the relay UAVs is determined based on forming and maintaining the wireless backhaul network, and the relay UAVs can connect the application UAVs to a ground station. A wireless backhaul network access point connects to the wireless backhaul network.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided to/for implementing a self-organizing, autonomous network of unmanned aerial vehicles (UAV), all linked via a high bandwidth (for example, of the order of 2 Gbps (billions of bits per second) 60 GHz (billion hertz)) wireless backhaul network that enables on-demand communications and sensing (for example, in a wide variety of scenarios). The use of a high bandwidth backhaul enables (for example, a new class of) heavy bandwidth consuming, latency-sensitive applications that execute on UAV networks, ready to be deployed at operating ranges that exceed the line-of-sight distances associated with UAVs today. Beyond LOS operating ranges can be anything between a few hundred meters to as far as the UAVs can go depending on various factors like the type of UAV, battery capacity, weather etc.

In one embodiment, the systems and methods implement a large-scale airborne self-organizing multi-UAV network that uses a high bandwidth wireless mesh backhaul throughout all its UAVs. The example embodiments utilize processes that jointly address the position, yaw and traffic routing across the network, as well as processes for optimizing fast-backhaul reconfiguration. In example embodiments, the UAVs support a network that can supply high-bandwidth Long-Term Evolution (LTE) coverage to a disaster area (e.g., hurricane or fire disasters), cooperative airborne surveillance of public events or autonomous search and rescue in challenging terrain.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the localizing and tracking system 100 either directly or through intervening I/O controllers.

Network adapters may also be coupled to the localizing and tracking system to enable the data processing system to become coupled to other data processing systems or remote printers or storage devices through intervening private or public networks. Modems, cable modem and Ethernet cards are just a few of the currently available types of network adapters.

Figure 1:
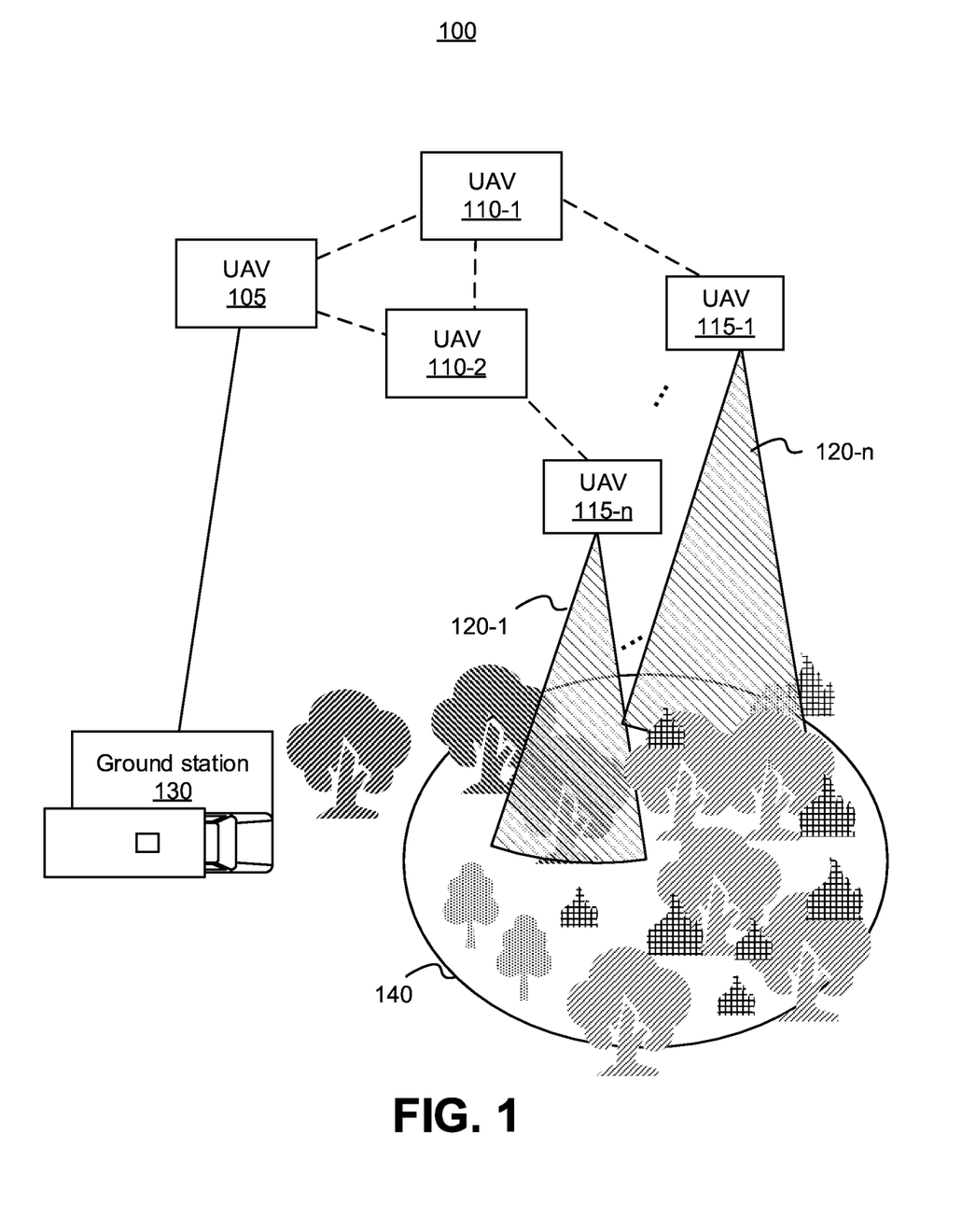
FIG. 1 is a block diagram illustrating a high-level system for implementing a network supported by unmanned aerial vehicles (UAVs), in accordance with an embodiment of the present invention.

Referring now in detail to the figures in which like numerals represent the same or similar elements and initially to FIG. 1, a system for implementing a network supported by unmanned aerial vehicles (UAVs) 100 is illustratively shown. The system 100 includes a ground station UAV 105, relay UAVs 110 (illustrated, by way of example, as 110-1 to 110-$n$), application UAVs 115 (illustrated, by way of example, as 115-1 and 115-2), and a control station 130 (e.g., terrestrial vehicle). Although particular numbers of UAVs are shown, any number of UAVs can be included in the network 100, in accordance with the embodiments described herein.

The UAVs (105, 110 and 115) can each carry a base station including a node (e.g., eNodeB) to provide connectivity from the control station 130 through the relay UAVs 110 to the application UAVs 115. Connections between the ground station UAV 105 and the control station 130 are illustrated by a solid line. The solid line indicates in-band (e.g., ground station) Command and Control (C&C). The connections between the UAVs (105, 110 and 115), illustrated by broken lines, can form a wireless multi-hop mesh network (in the air) which constitutes the backhaul for sending backhaul traffic between the UAVs (105, 110 and 115).

To simultaneously cater to the objectives of application coverage and backhaul connectivity, example embodiments can employ functionally specialized UAV operation. Application UAVs 115 focus their mobility decisions to meet application-specific objectives such as target tracking, cellular coverage, etc., while backhaul (for example, relay) UAVs 110 focus their mobility decisions on forming and maintaining a robust backhaul network to connect the application UAVs 115 to the ground station 130 even during event dynamics. The example embodiments can be deployed with role optimized payload design. Application UAVs 115 can carry a payload with more sensors (e.g., cameras, IR sensors, whitespace scanners, etc.) and less radios, while relay UAVs 110 can carry more radios and less sensors. Note that UAVs (105, 110, and 115) can be repurposed for different roles as warranted by the particular implementation of the system 100. A ground station UAV 105 can hover above or close to the station on the ground and serves as an airborne last-hop link connecting the system's 100 network to additional computing/networks (for example, the outside world).

The example embodiments can implement a self-organizing network of UAVs, interconnected through high-speed wireless communications (for example, wireless Millimeter wave spectrum (mmWave)) mesh backhaul, to enable aerial telepresence with the provision of high bandwidth communications (for example, in the order of a (few or more) Gbps bandwidth) and high-resolution sensing (for example, ability to operate high resolution cameras, sensors such as Lidar, Radar etc.). The example embodiments enable cooperative, airborne applications such as high-definition (for example, horizontal display resolution of approximately 4,000 pixels (4K)) video streaming of live events and high-bandwidth (multi-Gbps) mobile (e.g., LTE) coverage for users and first responders in public-safety situations (such as for example, flood, fire, earthquake, natural disasters, etc.), over larger areas 140 than is otherwise possible with a single UAV.

The example embodiments provide a capability for multiple UAVs (for example, UAVs 105, 110 and 115) to exchange/route data and coordinate over a high bandwidth backhaul on a practical scale. The example embodiments enable on-demand, low-altitude deployments, and implement an open and flexible network of UAVs that provides a high-bandwidth backhaul for real-time coverage of dynamic events over a wide area.

The example embodiments can provide a network of mmWave-linked UAVs with extended operating range beyond line-of-sight operations, in contrast to other systems which can be bounded by the range of the radio frequency (RF) link between the ground station and the UAV. With a UAV network implemented by the example embodiments, the operating range of all UAVs is extended through the network of UAVs that form a multi-hop mesh network for communications and control. Such a network can be deployed, on-demand to provide LTE coverage in public safety situations (e.g. areas hit by hurricanes), or as a wide-area search-and-rescue or surveillance assistance in inaccessible areas.

The example embodiments enable high bandwidth applications for coverage zones 120 in addition to increased coverage made possible by the UAV network. In contrast to approaches that are either limited to lower quality video streams (for example, 1080p or 720p), or require a tethered UAV for high-resolution streams, the example embodiments (for example, mmWave (60 GHz) mesh backhaul) can support a full resolution (for example, 8K 24 FPS (frames per second)) live stream using on an untethered UAV.

The example embodiments enable UAV-attached cloud computing. With a high-bandwidth, low latency mmWave mesh, cloud-based computing resources on the ground can be seamlessly integrated. Real-time, closed loop UAV network control using data streamed from UAVs and cloud-based artificial intelligence (AI)/analytics inference applications can be built over such a gigabit UAV network fabric as provided by the example embodiments. As an example, the example embodiments can enable real-time face recognition using a 4K video stream over a 60 GHz UAV network, with limited delay (for example 2 seconds) between video capture at the UAV 115 and successful face identification at cloud servers (not shown in FIG. 1).

The example embodiments manage the position and/or attitude (yaw/orientation) of the UAVs in the sparse multi-path environment on airborne platforms and maintain the physical alignment of 60 GHz antennas to ensure high capacity over long ranges. The example embodiments avoid small variations in position and/or attitude that can have a significant impact on link throughput, especially in mesh deployments.

The example embodiments can optimally manage the backhaul network by jointly solving for the optimal (a) topology of the UAVs 105, 110 and 115, and (b) traffic route between the UAVs 105, 110 and 115 and the ground station 130. Topology of backhaul network is how the relay UAVs 110 arrange themselves with respect to the application UAVs 115. The topology, defined by the number of UAVs 105, 110 and 115 deployed along with the aforementioned position and yaw of each UAV, is tightly coupled with the routing policy employed throughout the backhaul network. The position and yaw of each UAV determines the UAV's connectivity and capacity to its neighboring UAVs, which in turn affects how this capacity is shared by multiple end-to-end traffic flows from other UAVs. The example embodiments determine (for example, solve for) topology and routing together (not topology or routing in isolation) resulting in an optimal UAV deployment solution. The example embodiments can also determine a smallest number of UAVs, to best use the available UAV resources to serve the application. The example embodiments solve a three-dimensional problem (position, orientation and routing) that is associated with reconfigurable mmWave networks on UAVs.

The example embodiments enable safe re-configuration of the backhaul. When catering to event dynamics, the UAVs need to migrate (for example, move) to a new configuration to continue their coverage and satisfaction of the application demands. The example embodiments enable migration in a fail-safe, collision-free manner.

According to an example embodiment, with each UAV carrying multiple 60 GHz interfaces, a 60 GHz mesh network forms a data plane that carries high bandwidth data between all UAVs (105, 110 and 115), and a ground station 130 bridge that is connected to external resources. A separate control plane (for example, over 60 GHz or public LTE, etc.) can provide command and control of all UAVs (105, 110 and 115) in the network.

The example embodiments implement an efficient process for optimal position, yaw and traffic routing across UAVs. Through a two-step optimization across radial and angular deployment directions, the system 100 can jointly solve the problem of UAVs network configuration across three dimensions: (i) the appropriate quantity and position of UAVs to be deployed; (ii) the yaw of the UAVs such that the position of the onboard (for example, 60 GHz) interfaces establish a desired mesh connectivity topology between the deployed UAVs (105, 110 and 115) as well as the ground station (GS) 130; and (iii) the routing of traffic between UAVs (105, 110 and 115) and the GS 130 to satisfy the application's traffic demands.

The example embodiments can implement a process that leverages multiple layers of altitude to ensure that reconfiguration of the UAVs' position and yaw is carried out quickly (in shortest (minimum) time) in response to dynamic events, while remaining collision-free. The example embodiments have a capability to efficiently deploy, maintain and adapt a (for example, mmWave) backhaul network to support both dynamic communication (data transfer) and sensing (for example, live video streaming and analytics) applications. The processes described herein can support twice as much traffic demands for a given UAV budget (for example, number of UAVs), or satisfy the desired traffic demands at half the UAV budget, over baseline solutions addressing either of the respective objectives.

Figure 2:
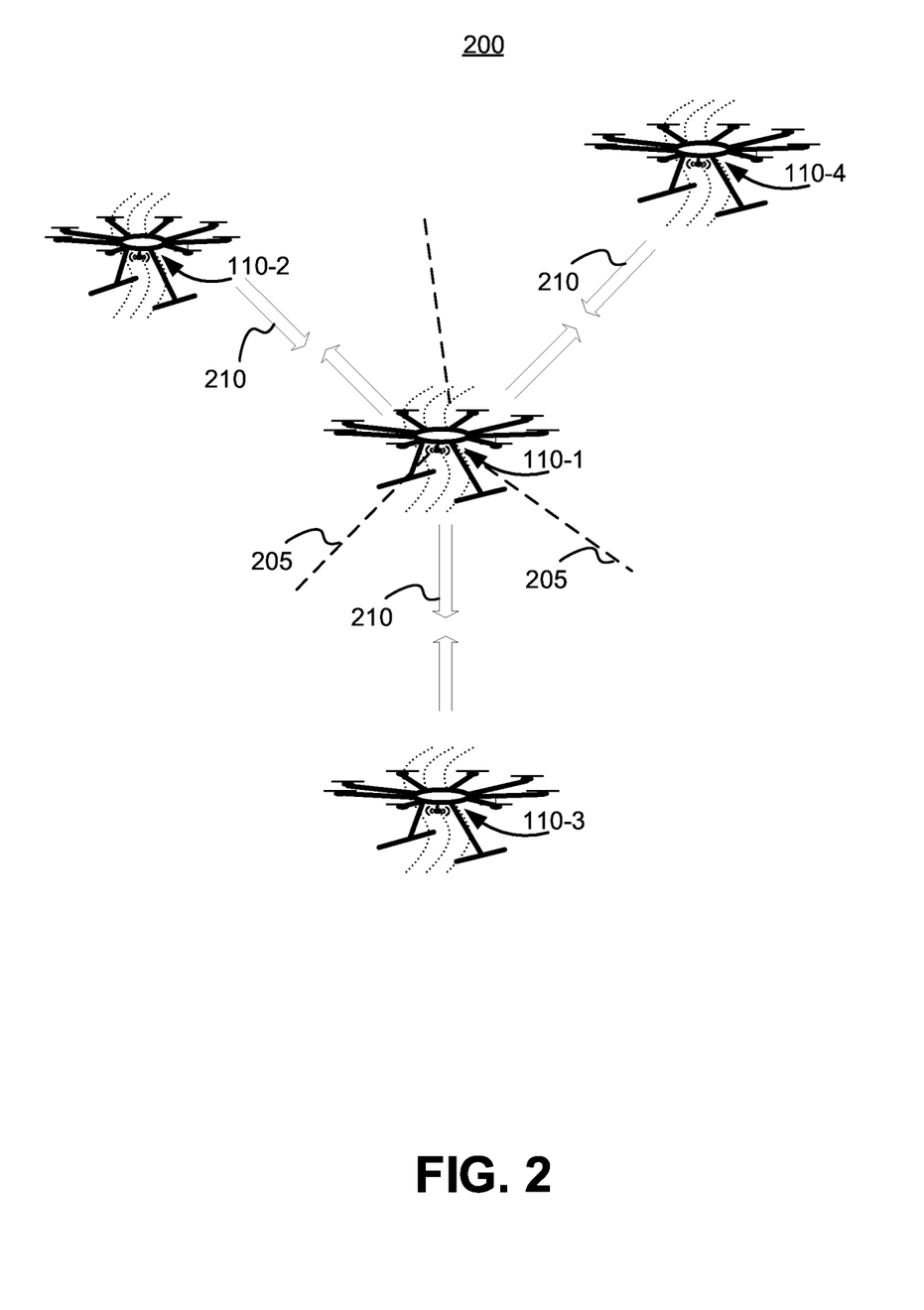
FIG. 2 is a block diagram illustrating orientation of UAVs for capacity sharing, in accordance with an embodiment of the present invention.

Referring now to FIG. 2, a block diagram 200 illustrating a process for maintaining acceptable orientation of UAVs for capacity sharing is illustratively depicted in accordance with an embodiment of the present principles.

UAV (for example, UAV 110-1) yaw (orientation) affects capacity sharing of its 3 radios (each with 120° field of view (FoV)) with neighbors (for example, UAVs 110-2 to 110-4).

The example embodiments model the impact of UAV's (105, 110 and 115) yaw on link performance, including with mesh connectivity. In some instances, when the UAVs are outdoors, angular coverage is limited to ±80°. In example embodiments long range (for example, 60 GHz) radios can be mounted on (or incorporated into) UAVs (105, 110 and 115). For example, the radios can include IEEE 802.11ad devices that can utilize, for example, a corresponding chipset and a 96-element phased array antenna, and support three non-overlapping channels (each shown within boundaries 205). Each beamforming sector is 6° with a small overlap between adjacent sectors. Beam and rate selection processes can be used to select optimal operating parameters for each 60 GHz link. A single link can support physical layer (PHY) bitrate of up to 2.3 Gbps (Modulation index 0 to 8). The transmission power can be set to maximum, to achieve maximum link coverage.

For a given yaw angle (0°) of the receiving UAV, the example embodiments vary the relative yaw angle of the transmitting UAV from −80° to +80°, while sampling throughput measurements at regular yaw intervals. Successful (for example, 60 GHz) link connectivity can be defined as throughput that exceeds a predetermined threshold (for example, 100 Mbps) at different distances and relative yaws. In some instances, connectivity can be established across relative yaws from −80° to +80° when the UAVs are 80 m apart, while only between −20° and +20° for distances greater than 240 m. This can be attributed to the side-lobes of the transmitting (Tx) beam 210 (not separately shown), whose energy is sufficient to establish connectivity at short ranges, thereby increasing angular coverage. However, the energy of the side-lobes has little to no impact at longer ranges, where the main lobes determine coverage. This interplay between main and side-lobes is also reflected in the selected bitrate over the 60 GHz channel. At short distances (for example, 80 m), the maximum bitrate is selected over a wider range of relative yaw angles than at longer UAV distances (120 m).

The throughput model of the (for example, 60 GHz) UAV links is a function of both the relative UAV distance (D) and yaw angles ($\Delta\varphi$). A weighted least-square regression approach that accounts for heteroscedasticity of the throughput numbers in our dataset, results in the following quadratic model as the best fit: $\mathbb{C} = a \cdot \mathbb{D}^2 + b \cdot (\Delta\phi)^2 + c \cdot (\Delta\phi) \cdot \mathbb{D} + d \cdot \mathbb{D} + e \cdot (\Delta\phi) + f$, where a, b, c, d, e, and f are constants derived from a regression curve-fitting technique. A surface curve-fitting of the model can capture the parabolic dependence of throughput on both $\mathbb{D}$ and $\Delta\varphi$.

The example embodiments can leverage the model. While a throughput's quadratic dependence on distance is expected in a line-of-sight (LoS) environment, the model's contribution incorporates the joint dependence on both relative distance and yaw. The throughput model complementarily captures the impact of UAV's yaw on first order (median, mean) throughput statistics. The latter allows the system to optimize its deployment decisions that are executed at coarse time scales (for example, minutes granularity). Further, the example embodiments determine a model that depends only on the (for example, mmWave) radios and antennas employed.

Figure 3:
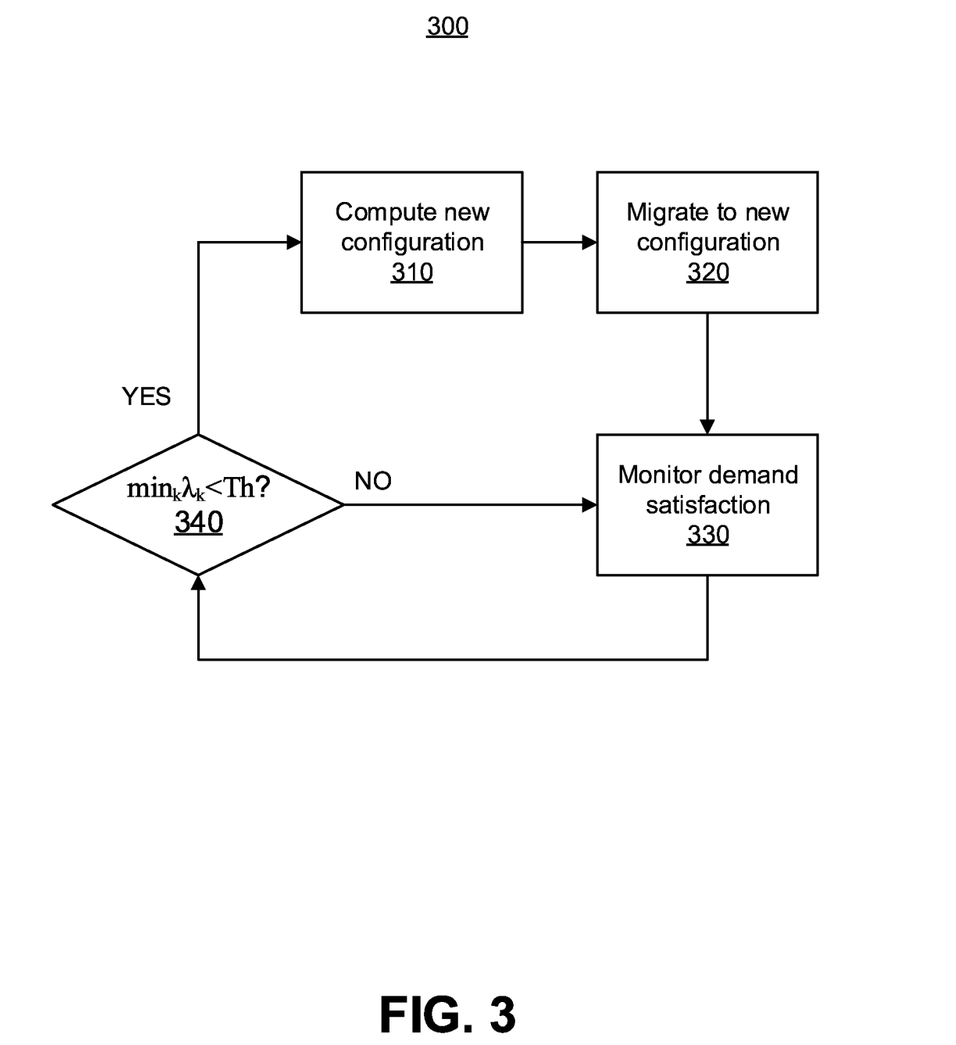
FIG. 3 is a block diagram illustrating an operational sequence of a network supported by UAVs, in accordance with an embodiment of the present invention.

Referring now to FIG. 3, an operational sequence 300 of a network supported by UAVs is illustratively depicted in accordance with an embodiment of the present principles.

The example embodiments provide real-time coverage and tracking of a target application (e.g. mobile connectivity, live video surveillance, etc.) from a ground station 130 (that could be far away) using one or more UAVs (105, 110 and 115). The example embodiments can accomplish this through an operating control loop, as shown in FIG. 3. When the UAV supported network is first initialized or a configuration update is triggered, the network (i) determines an efficient network configuration to meet the desired application objectives (compute new configuration 310). Then, UAV supported network (ii) computes a seamless migration plan to enable UAVs to optimally and safely reconfigure themselves in this configuration (migrate to new configuration 320). Once the UAVs are in their new configuration, the system continuously (iii) monitors performance across the (for example, 60 GHz) mesh to track application dynamics (monitor demand satisfaction 330) and triggers a reconfiguration/migration step, when the traffic satisfaction (of sessions, $\lambda_k$) falls below a desired threshold (Th) ($\min_k \lambda k < Th$) (340).

The example embodiments can address a two-dimensional network configuration task at a given altitude. The task of UAV network configuration (deployment, connectivity and routing (DCR)) requires a joint optimization across three components: (i) Deployment (placement) of UAVs (105, 110 and 115); (ii) Connectivity between UAVs and ground station (GS) 130 as determined by orientation (yaw) of UAVs' (105, 110 and 115) radios; and (iii) Routing of traffic between UAVs (105, 110 and 115) and GS to satisfy the application's traffic demands. For easier exposition of the formulation and solution, a single ground station (GS) 130 is considered. One of the UAVs (UAV 105) is statically positioned above the GS 130 and serves to anchor the rest of the dynamic system network (FIG. 1). Furthermore, from a practical realization standpoint, the flow routing can be treated as non-splittable, e.g., traffic in a session between application-covering UAVs and the GS 130 must be routed without being split at any intermediate UAV. The formulation and implementation can be adapted to meet the setting of multiple ground stations 130 and UAVs and splittable flow.

Referring back to FIG. 1, the system can be configured to cover and track an application/event that spans across multiple regions ($A_k$; $k \in K$) on the ground (shown covered by 120-1 to 120-n), from appropriate, corresponding zones in the sky at a given altitude (two dimensional (2D) plane). Thus, each of these zones generates a traffic demand $T_k$ (e.g., video streams, small cell traffic, etc.) that needs to be delivered to the GS UAV (node 0) 105, which is assumed to be at the origin in the deployment plane.

$$\text{DCR:} \quad \mathcal{D}^* = \min_\mathcal{D} |\mathcal{D}| \quad (1)$$

$$\text{s.t.,} \quad 1(p_k \in \mathcal{A}_k) = 1, \quad \forall k \in \mathcal{K}$$

$$\sum_i x_{ki}^k = 1, \quad \forall k \in \mathcal{K}$$

$$\sum_i x_{i0}^k = 1, \quad \forall k \in \mathcal{K}$$

$$\sum_v x_{vi}^k = \sum_u x_{iu}^k, \quad \forall (i, k): i \neq \{0, k\}$$

$$\sum_u \gamma_{iu} s_{iu}^m + \sum_v \gamma_{vi} s_{vi}^m \leq 1, \quad \forall i, m \in [1, M]$$

$$\gamma_{iu} C_{iu} \geq \sum_k T_k x_{iu}^k, \quad \forall u, i \in D$$

$$\gamma_{vi} C_{vi} \geq \sum_k T_k x_{vi}^k, \quad \forall v, i \in D$$

D denotes the network configuration to be determined, $\mathcal{D} = \{U_i(p_i, \phi_i, X_i)\}$, where each element in the configuration corresponds to that of a UAV i, namely its position $p_i$, orientation $\varphi_i$ and its flow routing $X_i = \{x_{iu}^k\}$, $\forall u \neq i, k$. Each element of X, is a binary variable corresponding to whether flow k is routed from i to u (e.g., $x_{iu}^k$). $C_{uv} = C_{ap}(p_u, p_v, \varphi_u, \varphi_v)$ is the expected throughput of the link u–v, which depends on the distance between them (e.g., their locations, $p_u$, $p_v$) as well as their respective orientation of the radios ($\varphi_u$, $\varphi_v$), e.g., $C_{ap}(p_u, p_v, \varphi_u, \varphi_v) = C_a p(\Delta r(p_u, p_v), \Delta \varphi(\varphi_u, \varphi_v))$. The adjacent radios (total of M) at a UAV are separated by $$\frac{2\pi}{M}$$

radians, with each radio responsible for covering its sector of $$\frac{2\pi}{M}$$

radians. of radios at the UAV. $s_{iu}^m$ is a binary variable that captures the presence of a UAVu in the m-th sector of UAV i and depends on their respective positions $p_u$, $p_v$ as well as UAV is orientation $\varphi_i$. Note that a UAV's position $p_u$ is captured in terms of its polar coordinates ($p_u = (r_u, \theta_u)$) taken with respect to the GS UAV 105 at origin.

The system applies DCR to find the optimal (minimal cost in number of UAVs) deployment configuration D* that yields a feasible flow routing, satisfying traffic demands, while accounting for directional connectivity/capacity constraints. The first constraint ensures that there exists a UAV (115) positioned in each of the zones to provide desired application coverage. The next three constraints correspond to flow origination (at UAVs covering application k), termination (at GS UAV 0) and conservation (UAVs in between). Note that the system can handle bi-directional traffic as well, where upstream and downstream flows will be considered as separate sessions. The final three constraints are responsible for coupling flow routing to the notion of directional connectivity and capacity at each of the UAVs. Specifically, for all the links (incoming and outgoing) that share the capacity of a radio (e.g., all the neighbors that fall in the sector of that radio m) at a UAV i, there must be a feasible time-sharing of those links (third last constraint), taking into account their respective capacities, that is capable of carrying the desired traffic demands (last two constraints).

The example embodiments address DCR considerations (for example, objectives) at multiple levels. (i) Coupled objectives: When a UAV (k) tracking an application session is also used to relay traffic for another session, i (fourth constraint, i≠k), this can lead to conflicting objectives of seamless application coverage versus maintaining backhaul connectivity (to the GS 130). (ii) Hardness of computing configurations: The 3-way optimization in DCR pertains to the UAV environment. The DCR requires solving for three components routing, orientation and deployment, jointly. (iii) Practical realization and adaptation of configurations: The UAVs have to periodically adapt and reposition themselves in a new network configuration to seamlessly track a spatially evolving event (e.g., a forest fire, such as illustrated in area 140 of FIG. 1). The example embodiments are designed to execute migration of network configurations involving multiple UAVs simultaneously both quickly and safely (for example, avoiding any UAV collisions).

Figure 4:
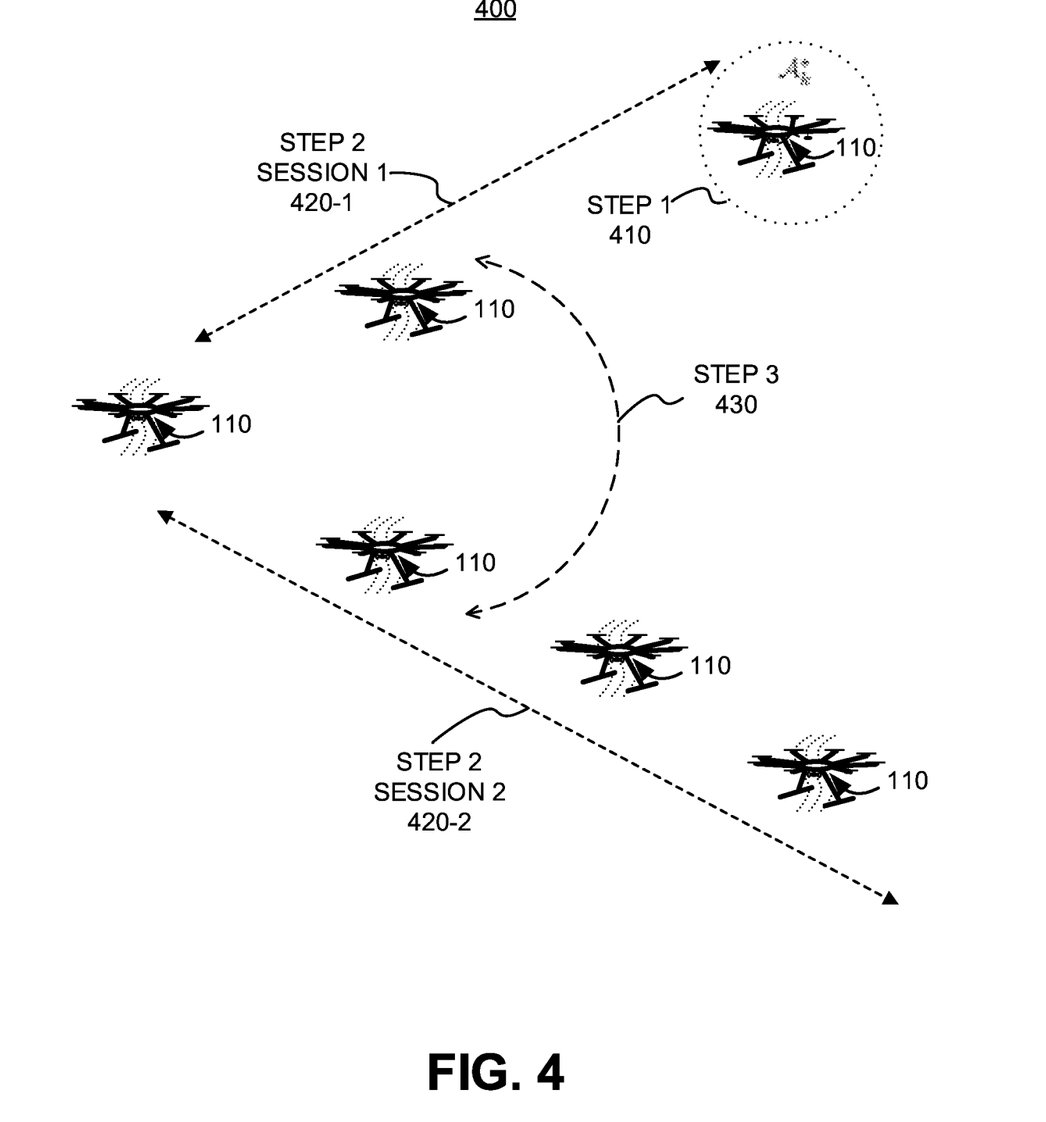
FIG. 4 is a block diagram illustrating radially optimized deployment per session, in accordance with an embodiment of the present invention.

Referring now to FIG. 4, radially optimized deployment per session 400 is illustratively depicted in accordance with an embodiment of the present principles.

The example embodiments integrate the components of deployment, connectivity and routing to compute efficient configurations, along with the dynamic mechanisms to adapt and realize these configurations safely in practice.

As shown in FIG. 4, an application UAV 115 can be deployed in the optimal position 410 ($\mathcal{A}_k^*$) of each of the coverage zones 120. This position ($p_k = \mathcal{A}_k^*$ 410, step 1 in FIG. 4) can be determined by each of the application UAVs 115 individually based on the application/event they are covering (e.g., tracking a forest fire using a camera, etc.).

Given the position of the application UAVs 115, e.g., $p_k = \mathcal{A}_k^*$; ∀k∈K, the system determines an efficient UAV (backhaul) network configuration D* to satisfy their traffic demands through a two-step optimization (steps 2 (420), 3 (430) in FIG. 4): radial optimization per session (as described with respect to FIGS. 4 and 5), followed by angular optimization across sessions (as described with respect to FIG. 6 herein below).

Radial optimization per session can be implemented given an optimal position of the application UAVs 115 $\mathcal{A}_k^*$, ∀k with respect to event coverage. The system determines the GS UAV's 105 orientation that radially optimizes the deployment of relay UAVs 110 to support the desired traffic demands to/from each session (application UAV 115) in isolation (steps 1-13, process 1, herein below), while load balancing across the capacity of GS UAV's 105 radios. The system executes process 1 for joint deployment, connectivity and routing as follows:

1: % Load-balanced deployment: Radial optimization per session
2: Input: GS UAV at $p_0=(0, 0)$, Application UAVs 115 at $p_k = \mathcal{A}_k^* = (r_k, \theta_k)$, ∀k∈K
3: Output: $\mathcal{D}_m^{cur} = \{U_i(p_i; \varphi_i; X_i)\}$ % backhaul network configuration
4: for $\varphi = [0, \frac{2\pi}{M}$ do
5: for m=[1, M] do
6: % app UAVs (115) in GS UAV's (105) sector m, orientation φ
7: $S_{m,\varphi} = \{k \in K: sector(k, \varphi)=m\}$
8: $[N_{k,m,\varphi}, D_{m,\varphi}] = Get\_RadialOpt\_Dep(m, \varphi)$
9: end for
10: $D\varphi = \cup_m D_{m,\varphi}$
11: end for
12: $\varphi_{GS} = \arg\min_\varphi \{N(D_\varphi) = \Sigma_m \Sigma_{k \in S_{m,\varphi}} N_{k,m,\varphi}\}$
13: $\mathcal{D}^{cur} = \mathcal{D}_{\varphi_{GS}}$
14: % Contraction: Angular Optimization across sessions
15: for m∈[1; M] do
16: % Initialize all contraction variables
17: Con(i, j)=1, ∀i,j∈$\mathcal{D}_m^{cur}$:{S(i)≠S(j) &
18: i,j≠k, k∈$S_{m\varphi_{GS}}$}; and 0 otherwise
19: do
20: $I_{con}$=False
21: for (i, j)∈$\mathcal{D}_m^{cur}$:Con(i, j)≠0 do
22: L(i, j)=Get_ContractPoints(i, j, $\mathcal{D}_m^{cur}$)
23: $\hat{L} = \{\ell \in L(i, j):$
24: ∃Feasible_Orient(i, j, $\ell$, $\mathcal{D}_m^{cur}$)}
25: $\ell^* = \arg\min \ell_{\in \hat{L}} \{\sqrt{\Sigma_{k' \in S(i) \cup S(j)} \Delta r^2(p_\ell, p_{k'})}\}$
26: if $\hat{L} \neq \emptyset$ then
27: $\mathcal{D}_m^{cur} \leftarrow Update\_Config(i, j, \ell^*, \mathcal{D}_m^{cur})$
28: $I_{con}$=True; break
29: else
30: $C_{on}(i, j)=0$
31: end if
32: end for
33: while Icon==True
34: end for
35: % Contracting UAVs across adjacent sectors
36: Repeat Contraction steps, while replacing $\mathcal{D}_m^{cur}$ with $\mathcal{D}_{m,m+1}^{cur} = \mathcal{D}_m^{cur} \cup \mathcal{D}_{m+1}^{cur}$.

The system accomplishes radial optimization per session by determining the minimal relay UAV 110 deployment needed for a given GS UAV's 105 orientation (steps 5-10, process 1), and then picking that orientation that yields the minimum deployment among all its orientations (step 12, process 1)). When the GS UAV's 105 orientation (φ) is fixed, this geometrically partitions ($S_{m,\varphi}$) the application UAVs 115, e.g., load balances the traffic demands of the application UAVs 115 across the capacity of various radios (sectors, m) at the GS UAV 105 (step 7, process 1). In each sector of the GS UAV 105 m, the system determines the minimal UAV deployment (step 8 in process 1) needed to support the traffic demands of the application UAVs 115 in that sector (e.g., $S_{m,\varphi}$) by solving the following optimization task.

Init_Deploy($m$, $\phi$, $S_{m,\phi}$):

Minimize$_{h_k}$ $\left\{ \sum_{k \in S_{m,\phi}} N_{k,m,\phi} = \left\lceil \frac{r_k}{h_k} \right\rceil \right\}$ Subject to, $\gamma_k \cdot Cap(0, (h_k, \theta_k), \phi, 0) \geq T_k$, $\forall\, k \in S_{m,\phi}$ $\sum_{k \in S_{m,\phi}} \gamma_k \leq 1$ This optimization helps determine the minimal number of UAVs 110 and their deployment positions needed to support the traffic demand of each session in isolation (without sharing relay UAVs 110 across sessions), while accounting for time ($\gamma$k) sharing the same radio's capacity (at the GS UAV 105) between sessions in the same sector. By implementing the quadratic capacity function (described above with respect to FIG. 2), the system implements this task through an equivalent convex optimization (relax ceiling function first and round fractional solution later). Once the UAV deployment is determined, their orientations are identified to deliver the data rates needed to satisfy the corresponding session's traffic demand. The union (the set of all UAVs across all the sectors) of the relay UAV 110 deployments in each sector provides the initial backhaul network configuration that is radially optimized to support the given traffic demands.

Figure 5:
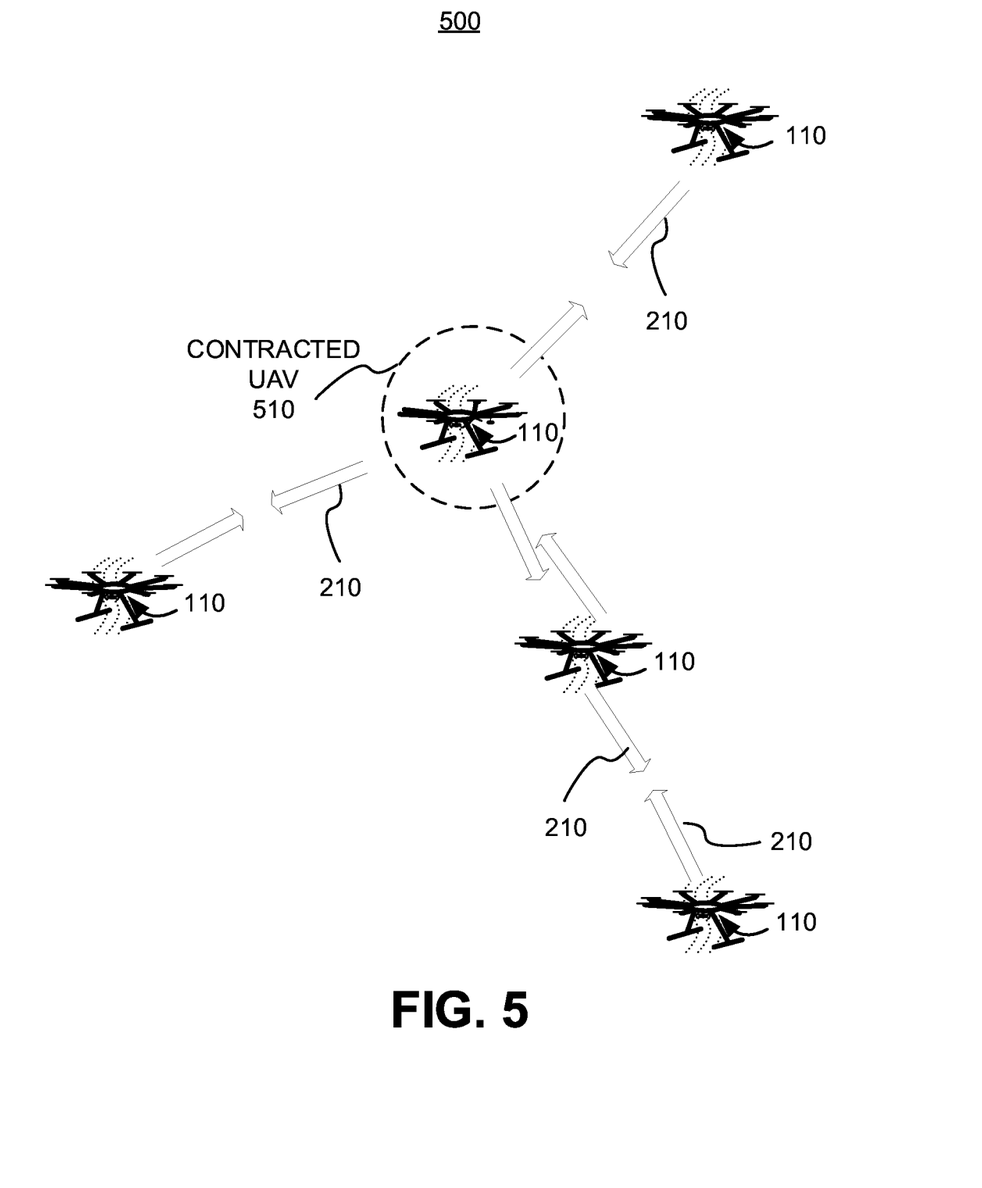
FIG. 5 is a block diagram illustrating angularly optimized deployment per session, in accordance with an embodiment of the present invention.

Referring now to FIG. 5, angularly optimized deployment per session 500 is illustratively depicted in accordance with an embodiment of the present principles.

The system implements angular optimization across sessions (optimizes the deployment angularly) by contracting (eliminating) relay UAVs 110 (contracted UAV 510) with abundant radio capacity (210), and repositioning/orienting the remaining relay UAVs 110 so as to efficiently utilize their available radio capacity across sessions, all while continuing to support the desired traffic demands (steps 16-35, process 1). During this optimization in each sector, the system checks every pair of relay UAVs 110 that belong to different sessions, whether they can be contracted, e.g., removed and replaced by a single UAV 110 in a new, appropriate position and orientation, while supporting the aggregate traffic belonging to both the original UAVs 110 (steps 22-33, process 1). When such a pair of UAVs 110 exists, the contraction is done and the two UAVs 110 are replaced by the new UAV 110 and the network configuration is updated (steps 27-30, process 1). For example, neighborhood connectivity for the new UAV 110 along with the routing of flow on its edges, as well as its (and neighbors') orientation are updated.

Figure 6:
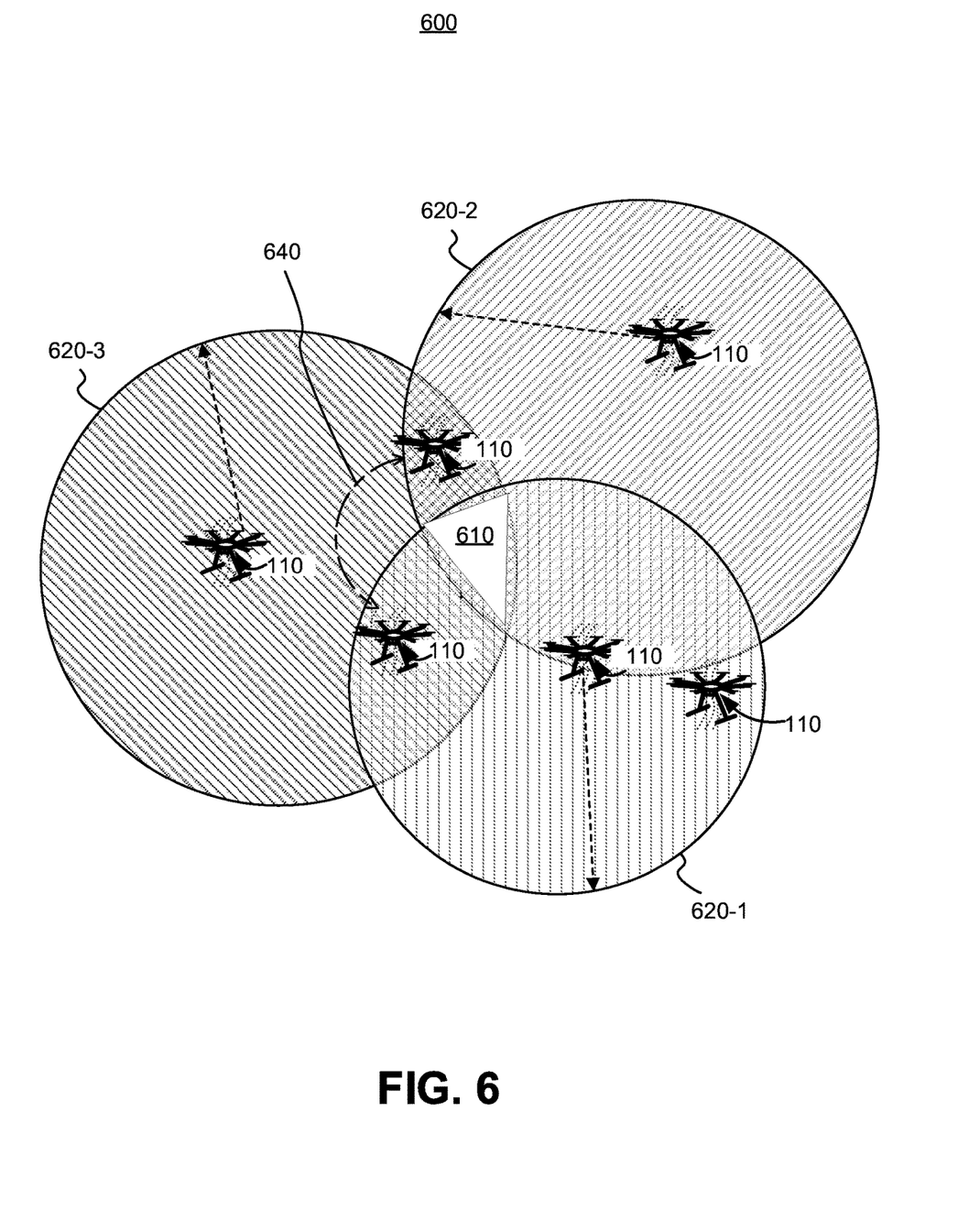
FIG. 6 is a block diagram illustrating bounding of a feasible region for contraction, in accordance with an embodiment of the present invention.

Referring now to FIG. 6, bounding of a feasible region for contraction is illustratively depicted in accordance with an embodiment of the present principles.

According to example embodiments, the system determines whether a pair of relay UAVs 110 can be contracted, given the combinations of position and orientation possible for the new contracted UAV 110. The system first identifies the largest contraction region possible by relaxing the constraint of orientation (e.g., assumes perfect orientation, $\Delta\varphi=0$); then, selects a small number of boundary points of this region as potential contraction points (step 23 in process 1). Finally, for each of these contraction points, the system determines if there exists a feasible orientation for both the new contracted UAV 110 as well as all its neighbors such that existing traffic demands can be satisfied (steps 24, 25 in process 1).

The contraction region is determined by the polygon 610 formed from the intersection of the circles 620, one for each neighbor of the pair of UAVs 110 (shown as circles 620-1 to 620-3) being contracted and whose radius corresponds to the maximum distance (Cap−1(T)) that supports the traffic demand between that neighbor and the two UAVs 110 as shown in FIG. 6. The corner points of this polygon along with its centroid are selected as a representative set of contraction points to be evaluated for a feasible orientation for routing. If multiple contraction points are feasible, then the one that is farthest from the GS UAV 105 and closest to the application UAVs 115 is selected (step 26 in process 1). With contraction proceeding radially from the GS UAV 105, this increases the scope for subsequent optimization/contraction. In checking whether a feasible orientation exists (for demand satisfaction, $\lambda^*\varphi \geq 1$) for the new contracted UAV 110 and all its neighbors UAVs 110, an optimization Solve_Orient( ) is solved for each of the UAVs 110 (contracted UAVs 110 represented by 640) under consideration.

Solve_Orient($\ell$, B($\ell$), T($\ell$), $\phi_{N(\ell)}$):

Maximize$_{\gamma,\phi\ell}$ min$_m \lambda_{m\ell,\phi\ell}$ s.t., $\gamma_{b,m\ell} \cdot Cap(p\ell, p_b, \phi\ell, \phi_b) \geq \lambda_{m\ell,\phi\ell} \cdot T_b$, $\forall b \in S_{m\ell,\phi\ell}$, $\forall m\ell$ $\Sigma_{b \in S_{m\ell}} \gamma_{b,m\ell} \leq 1$, $\forall m\ell$ where, $S_{m\ell,\phi\ell} = \{b \in B(\ell): \text{sector } \ell\, (b,\phi\ell) = m\ell\}$ The above optimization selects an orientation for UAV $\ell$ and a time-sharing solution ($\gamma$) for each of its sectors such that the maximum amount of its traffic demands can be satisfied. For a given orientation of the UAV ($\phi\ell$), this optimization can be decoupled across the UAV's sectors ($m\ell$), where it becomes linear and can be solved individually (optimally) in each sector. Thus, the above optimization has the following closed-form solution shown in Equations (2) to (4).

$$\hat{\lambda}_{m_\ell,\phi_\ell} = \frac{\prod_{b \in S_{m_\ell,\phi_\ell}} \frac{T_b}{Cap(p_\ell, p_b, \phi_\ell, \phi_b)}}{\sum_{b \in S_{m_\ell,\phi_\ell}} \frac{\prod_{b \in S_{m_\ell,\phi_\ell}} \frac{T_b}{Cap(p_\ell, p_b, \phi_\ell, \phi_b)}}{Cap(p_\ell, p_b, \phi_\ell, \phi_b)}} \qquad (2)$$

$$\phi_\ell^* = \arg\max_{\phi_\ell \in [0, \frac{2\pi}{M}]} \min_{m_\ell} \hat{\lambda}_{m_\ell,\phi_\ell} \qquad (3)$$

$$\lambda_{m_\ell}^* = \hat{\lambda}_{m_\ell,\phi_\ell^*} \qquad (4)$$

In addition to contraction within each sector of the GS UAV 105, the system also explores contraction across the edges of adjacent sectors (step 38 in process 1). The system executes the contraction procedure again within each virtual sector, where the latter consists of two adjacent sectors. This additional contraction optimization can be traded in favor of computation time based on user specifications (for example, if desired/favored).

Figure 7:
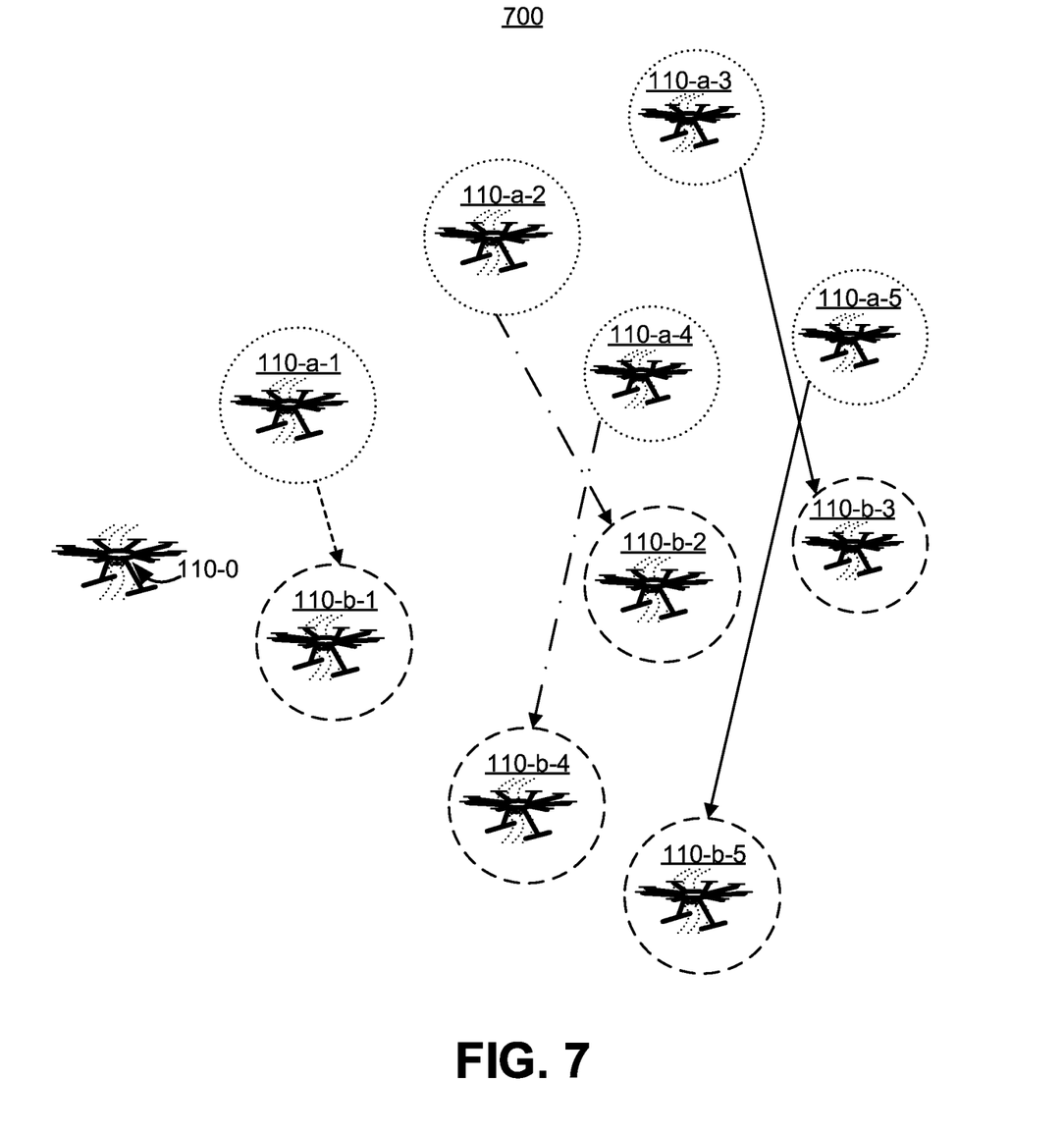
FIG. 7 is a block diagram illustrating adaptation of backhaul configurations, in accordance with an embodiment of the present invention.

Referring now to FIG. 7, min-max matching between (for example, old and new) configurations 700 is illustratively depicted in accordance with an embodiment of the present principles.

When an update is triggered, a new configuration will be computed by the system (process 1, described herein above with respect to FIG. 4) based on current position and demand of application UAVs 115. In order to realize this new configuration in the system migrates the relay UAVs 110 from old (for example, first, initial, etc.) configurations (represented in FIG. 7 by UAVs 110-a-x, where x indicates a number of the UAV 110, shown by example as UAV 110-a-1 to UAV 110-a-5 within the dotted circles) to a new (for example, second, target, etc.) configurations (represented in FIG. 7 by UAVs 110-b-x, where x indicates a number of the UAV 110, within the dashed circles) (as shown in FIG. 7) optimally (for example, least time taken) without any conflicts (collisions) in the airspace. The system accomplishes this migration through an optimal de-confliction flight control algorithm (process 2) by leveraging various layers of altitude as described below. Process 2 executes a de-conflicted configuration migration that can be used within a seamless UAV migration plan as follows:

1: Determine min-max bipartite matching assignment between old and new configuration UAV positions (with Euclidian distance as weights), which minimizes the time taken to migrate to the new configuration.

2: Differentiate (for example, color, different line types as shown in FIG. 7) the conflict graph created with matching assignments as vertices and crossing assignments (in the Euclidian plane) as conflicts (edges).

3: Assign configuration changes (edges) with different identifiers (for example, colors) to different altitudes to get a collision-free flight control path.

4: Move the UAVs 110 (assigned to different altitudes) in altitude (z-axis) alone first, while retaining their position in the x-y plane; then let the UAVs 110 in different altitudes move to their new position in the x-y plane as dictated by their new configuration; then bring the UAVs 110 all back to the original altitude for operation in the new configuration.

The flight plan for minimum (or to minimize) migration time can be implemented as follows (Step 1): the system first determines the flight plan that would result in the least duration required to migrate to the new configuration, without accounting for potential conflicts between UAV movements during the migration (to be resolved in the second step). The system accomplishes this by formulating the flight plan problem as a variant of a bipartite matching problem, where the objective is to determine the min-max bipartite matching assignment between old and new configuration UAV positions (with Euclidian distance as weights; serves as a proxy for migration time). The min-max objective is selected to achieve the migration plan that minimizes the maximum of the weights, for example, longest time taken by any of the UAVs 110 during their simultaneous migration.

According to example embodiments, the system implements a migration process. Particularly, the system can apply processes to determine minmax bipartite matching (M2BM). The process forms a flow graph G" from the bipartite graph G, using the same set of vertices but adding a source and sink that are connected to the vertices in Vo and Vn respectively. Then it sorts the edges in G based on increasing weights and adds them one by one to G". At each iteration, a max-flow process is run between s and t on G" with all edges carrying a weight of one. The resulting max-flow solution yields a maximum matching M between vertices Vo and Vn in G. If the matching is perfect in G, e.g., its size is equal to that of the vertex set of G, then M is the target (for example, desired) migration configuration. Otherwise, the next sorted edge from G is added to G" and the process is repeated till a perfect matching is found. The resulting solution is optimal in the least time taken for configuration migration.

De-conflicting the flight plan (Steps 2-4): Process 2.1 (shown herein above) does not account for potential conflicts/collisions in the airspace, when the UAVs 110 migrate in tandem on the same Euclidian plane (e.g. when their migration paths cross). To deconflict such colliding migration paths, the system leverages the layers of altitude available for migration (steps 2-4, process 2). Specifically, the system creates a conflict graph $G_c$, with the edges of the output matching M, now serving as vertices ($V_c$) of $G_c$, while edges in $G_c$ correspond to migration paths ($V_c$) that conflict in the Euclidian plane (e.g., paths that cross or come in close proximity of one another). The system then differentiates (for example, colors) $G_c$ with the least possible differentiators (for example least possible colors) (step 2, process 2), and assigns migrations (vertices) with different differentiators (for example, colors, line types, etc.) to different altitudes to get a collision-free flight migration path (step 3, process 2).

Then, the system executes the migration in a three-step procedure: (i) moving the UAVs (assigned to different altitudes) in altitude (z-axis) alone first (for example, vertically), while retaining their position in the x-y plane (for example, keeping position in a horizontal plane); (ii) followed by allowing the UAVs 110 in different altitudes to move to their new position in the x-y plane (horizontally) as dictated by their new configuration; and (iii) finally, bringing them all back to the original altitude (for example, restoring vertical position) for operation in the new configuration.

In practice, owing to Euclidian constraints and migration solution with minimum duration (process 2.1), the conflict graph $G_c$ rarely has cliques of size three or more. This allows for at most three altitude layers (existing, one above, one below) needed to resolve the conflicts. Thus, the bulk of the time needed for configuration migration arises from moving to the new configuration at a prescribed altitude (time to move across altitude layers is relatively insignificant), which in turn is optimized by process 2.1.

According to example embodiments, the system accomplishes network configuration determination with an efficient complexity of $O(M \cdot (K^3+N_3))$, where the cubic impact is only with respect to number of sessions (K) and UAVs 110 (N) in a sector and not the whole network. Similarly, the configuration migration process can be optimized to run efficiently in $O(M \cdot N^3)$.

The system can adapt its backhaul network configuration from time-to-time to cater to the varying positions and traffic demands of application UAVs 115 that are tracking the target event. The system monitors the end-to-end throughput of each session at the GS 130 and triggers a network configuration update only when the current demand satisfaction of any session drops below a certain threshold Th (for example, balances responsiveness vs. session interruptions). The system first attempts to find a configuration with updates to only the yaws of the UAVs that carry traffic for the affected sessions. Only when this is not feasible, does the system execute a complete configuration update with potential UAV migrations.

Figure 8:
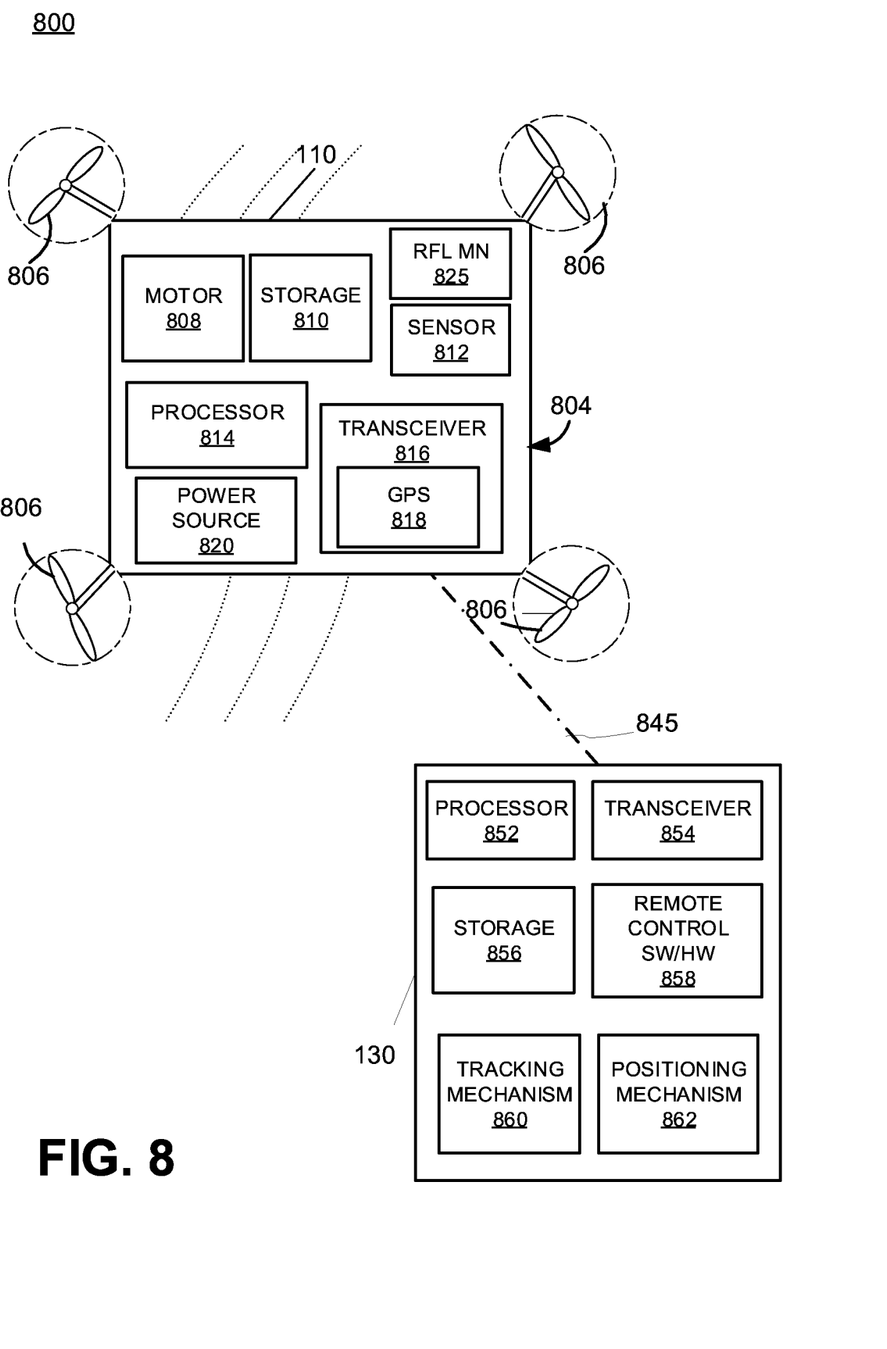
FIG. 8 is a block diagram illustrating components of an unmanned aerial vehicle (UAV) and a ground station, in accordance with an embodiment of the present invention.

Referring now to FIG. 8, a block diagram of components 800 of an unmanned aerial vehicle (UAV) 110 and a ground station 130 are illustratively depicted in accordance with an embodiment of the present principles.

According to an embodiment, the UAV 110 includes a propulsion system 806. The propulsion system 806 can include propellers or other engines for flying the UAV 110. In another embodiment, the propulsion system 806 may include a jet engine or hover technology. The propulsion system 806 may include one or more motors 808, which may include an internal combustion engine, electric motor, etc.

The UAV 110 may include a power source 820. The power source 820 may include or employ one or more batteries, liquid fuel (e.g., gasoline, alcohol, diesel, etc.) or other energy source. In another embodiment, the power source 820 may include one or more solar cells or one or more fuel cells. In another embodiment, the power source 820 may include combustive gas (e.g., hydrogen).

The UAV 110 may be equipped with computing functions and controls. The UAV 110 can include a processor 814. The UAV 110 can include a transceiver 816. In one embodiment, the transceiver 816 may be coupled to a global position system (GPS) 818 to generate and alert of a position of the UAV 110 relative to other vehicles and a common coordinate system. The transceiver 816 may be equipped to communicate with a cellular network system. In this way, the UAV's 110 position can be computed based on triangulation between cell towers base upon signal strength or the like. The transceiver 816 may include a Wi-Fi or equivalent radio system.

The UAV 110 can include one or more sensors 812 for making different measurements. The measurements may include pressure, temperature, wind speed, wind direction, speed, acceleration, etc. The sensor 812 can include an optical sensor, an infrared (IR) sensor or a camera. The sensor 812 can include an accelerometer or other motion sensor. It should be understood that the different systems of the UAV 110 may be employed in combination to take or make different measurements needed for the control of the UAV 110 or locating the UAV 110 from the ground using telemetry or other techniques.

The UAV 110 can include memory storage 810. The memory storage 810 may include solid state or soft storage and work in conjunction with other systems on the UAV 110 to record data, run algorithms or programs, control the vehicle, etc. The memory storage 810 may include a Read Only Memory (ROM), random access memory (RAM), or any other type of memory useful for the present applications. According to example embodiments, the UAV 110 can be used in implementing a self-organizing network of UAVs (such as 105, 110, and 115), interconnected through high-speed wireless communications (for example, wireless Millimeter wave spectrum (mmWave)) as described herein above.

The ground station 130 can include a processor 852, a transceiver 854, a storage 856, remote control software (SW)/hardware (HW) 858, a tracking mechanism 860 and a positioning mechanism 862. The transceiver 854 can communicate 845 with the UAV 110. In one embodiment, the transceiver 854 may communicate with a local area network (LAN), cellular system, Wi-Fi system, etc. The positioning mechanism 862 may receive axial adjustment commands from the ground station 130 through the connection 845. The axial commands along with the vertical and horizontal movements allow the positioning mechanism 862 to track or follow the UAV 110 as it travels. In one embodiment, the positioning mechanism 862 may have a tracking mechanism 860 to provide axial commands, which permit the ground station 130 to follow an object vertically and/or horizontally.

The ground station 130 can provide multiple services. The ground station 130 can connect to and provide (for example, receive) control (instructions) for the self-organizing multi-UAV network wireless communication network (for example, via an outside network to which the ground station 130 is connected). The ground station 130 can continually locate the UAVs 110. The ground station 130 can also perform real-time video analytics and forward video streams from the UAVs (105, 110, and 115) to associated graphical processing units (GPU) (for example, cloud based or using an associated device/processor) for object detection. The ground station 130 can be implemented with radio capacity to satisfy the net traffic demand at all the application UAVs 115.

Figure 9:
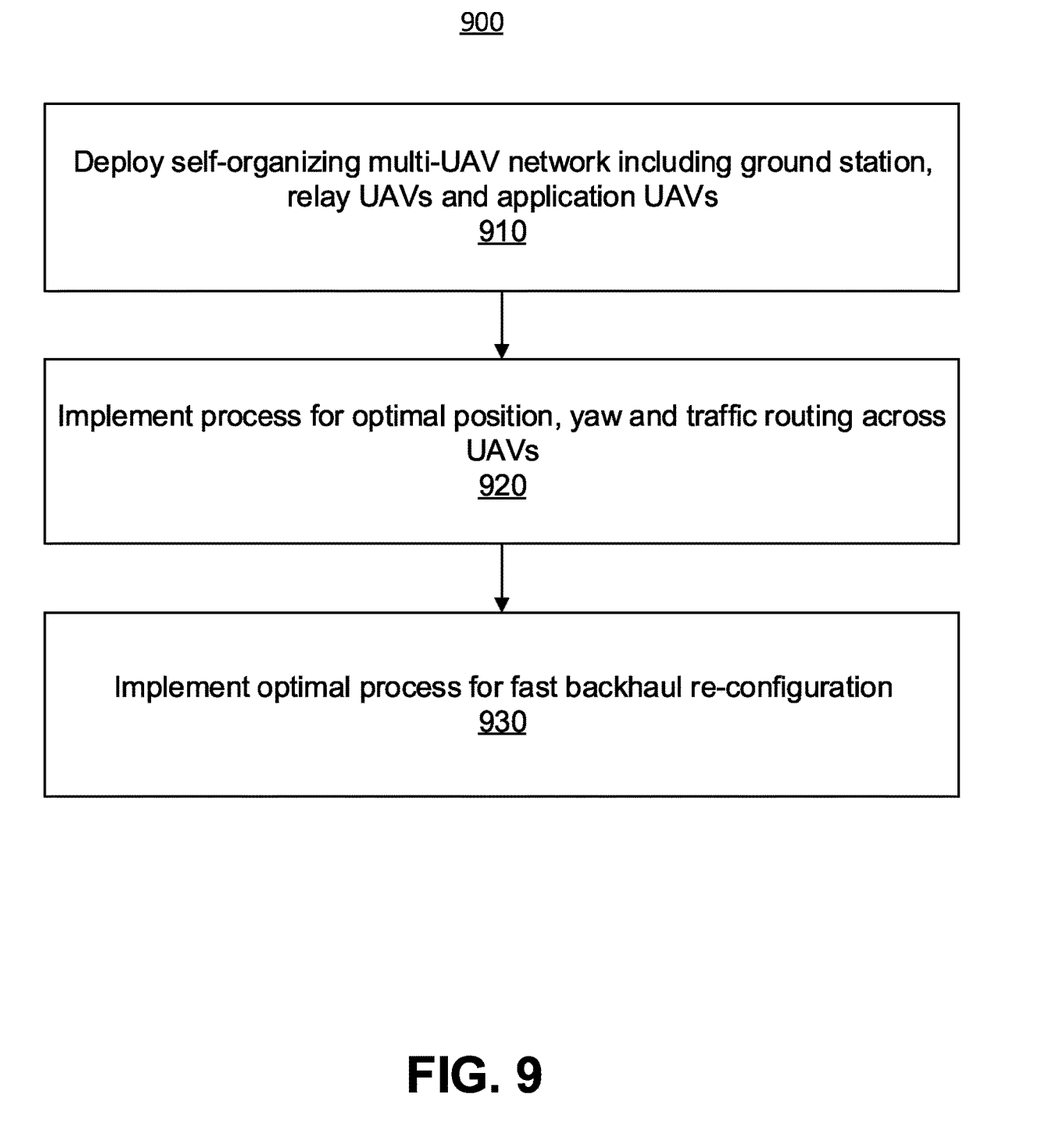
FIG. 9 is a flow diagram illustrating a method for implementing a network supported by UAVs, in accordance with an embodiment of the present invention.

FIG. 9 is a flow diagram illustrating a system/method 900 for implementing a network supported by UAVs, in accordance with the present invention.

At block 910, the system deploys the self-organizing multi-UAV network as described herein. The network can include a large-scale, airborne, self-organizing, multi-UAV network that operates over a 60 GHz mesh backhaul. The network can employ functionally specialized UAV operation including application UAVs 115 and relay UAVs 110. The application UAVs 115 focus their mobility decisions to meet application-specific objectives such as target tracking, cellular coverage, etc., while relay UAVs 110 focus their mobility decisions on forming and maintaining a robust backhaul network to connect the application UAVs to the ground station 130 (for example, even during event dynamics).

At block 920, the system implements a process for optimal position, yaw and traffic routing across UAVs. Through a two-step optimization across radial and angular deployment directions, the system jointly determines a solution for the UAVs network configuration across three dimensions: (i) the appropriate quantity and position of UAVs to be deployed; (ii) the yaw of the UAVs such that the position of the onboard (for example, 60 GHz) interfaces establish a target (for example, desired) mesh connectivity topology between the deployed UAVs as well as the ground station (GS) 130; and (iii) the routing of traffic between UAVs and the GS 130 to satisfy the application's traffic demands.

At block 930, the system implements an optimal process for fast backhaul re-configuration. The system employs a process that leverages multiple layers of altitude to ensure that reconfiguration of the UAVs' (105, 110 and 115) position and yaw is carried out quickly (in shortest time) (for example, in response to dynamic events), while remaining collision-free.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for implementing a multi-unmanned aerial vehicle (UAV) wireless communication network, comprising:

a plurality of application UAVs configured to wirelessly provide at least one application;

a plurality of relay UAVs configured to connect the plurality of application UAVs to a ground station;

the ground station configured to connect to a wireless backhaul network; and     at least one processor device operatively coupled to at least one memory device, the at least one processor device being configured to:

determine mobility for the plurality of application UAVs based on application-specific objectives;
determine mobility for the plurality of relay UAVs based on forming and maintaining the wireless backhaul network;
optimize a deployment of the plurality of relay UAVs angularly by
contracting at least one of the plurality of relay UAVs with abundant radio capacity;
repositioning a remaining of the plurality of relay UAVs to efficiently utilize their available radio capacity across sessions while continuing to support a target traffic demand; and
checking each pair of the relay UAVs that belong to different sessions whether the pair of the relay UAVs can be contracted and replaced by a single UAV in a new position and orientation, while supporting aggregate traffic belonging to the pair of the relay UAVs.

2. The system of claim 1, wherein the at least one processor device is further configured to:
implement a process for determining optimal position, yaw and traffic routing across the plurality of relay UAVs and the plurality of application UAVs.

3. The system of claim 1, wherein the at least one processor device is further configured to:
determine mobility for the plurality of relay UAVs based on a two-step optimization across radial and angular deployment directions.

4. The system of claim 1, wherein, when optimizing the deployment of the plurality of relay UAVs, the at least one processor device is further configured to:
determine a representative set of contraction points to be evaluated for a feasible orientation for routing based on an intersection of circles for each neighbor of the pair of the relay UAVs being contracted and whose radius corresponds to a maximum distance that supports traffic demand between the neighbor and the pair of the relay UAVs.

5. The system of claim 1, wherein the at least one processor device is further configured to:
jointly determine a configuration for the multi-UAV wireless communication network across three dimensions:
(i) a quantity and position of UAVs to be deployed;
(ii) yaw of the plurality of relay UAVs and the plurality of application UAVs such that a position of onboard interfaces establishes a target mesh connectivity topology between the plurality of relay UAVs, the plurality of application UAVs and the ground station; and
(iii) the routing of traffic between the plurality of relay UAVs, the plurality of application UAVs and the ground station to satisfy a traffic demand of the at least one application.

6. The system of claim 5, wherein the at least one processor device is further configured to:
implement an optimization to determine a minimal number of UAVs and deployment positions of the minimal number of UAVs to support a traffic demand of each session of the at least one application in isolation without sharing relay UAVs across sessions, while accounting for time ($\gamma$k) sharing a same radio's capacity at a ground station UAV between sessions in a same sector.

7. The system of claim 1, wherein the at least one processor device is further configured to:
implement an optimal process for fast backhaul re-configuration based on leveraging multiple layers of altitude to ensure that reconfiguration of a position and yaw of the plurality of relay UAVs is carried out in a minimum time while remaining collision-free.

8. The system of claim 7, wherein the at least one processor device is further configured to:
determine min-max bipartite matching assignment between old configuration positions and new configuration positions of the plurality of relay UAVs that minimizes a time taken to migrate to the new configuration positions.

9. The system of claim 7, wherein the controller is further configured to:
assign configuration changes in a conflict graph with differentiators to different altitudes to determine a collision-free flight control path;
move at least one set of UAVs assigned to different altitudes first, while retaining their position in a horizontal plane;
move the at least one set of UAVs in different altitudes o their new position in the horizontal plane;
move the at least one set of UAVs to an original altitude for operation.

10. A system for implementing a multi-unmanned aerial vehicle (UAV) wireless communication network, comprising:
at least one ground station UAV configured to provide a last-hop link to a ground station;
a plurality of application UAVs configured to wirelessly provide at least one application;
a plurality of relay UAVs configured to connect the plurality of application UAVs to the ground station via the at least one ground station UAV;
the ground station configured to connect to a millimeter wave spectrum (mmWave) mesh backhaul network; and
at least one processor device operatively coupled to at least one memory device, the at least one processor device being configured to:
determine mobility for the plurality of application UAVs based on application-specific objectives including at least one of high bandwidth communications and high-resolution sensing;
determine mobility for the plurality of relay UAVs based on forming and maintaining the mmWave mesh backhaul network; and
optimize a deployment of the plurality of relay UAVs angularly by
contracting at least one of the plurality of relay UAVs with abundant radio capacity;
repositioning a remaining of the plurality of relay UAVs to efficiently utilize their available radio capacity across sessions while continuing to support a target traffic demand; and
checking each pair of the relay UAVs that belong to different sessions whether the pair of the relay UAVs can be contracted and replaced by a single UAV in a new position and orientation, while supporting aggregate traffic belonging to the pair of the relay UAVs.

11. The system of claim 10, wherein the at least one processor device is further configured to:
implement a process for determining optimal position, yaw and traffic routing across the at least one ground station UAV, the plurality of relay UAVs and the plurality of application UAVs.

12. The system of claim 10, wherein the at least one processor device is further configured to:

determine mobility for the plurality of relay UAVs based on a two-step optimization across radial and angular deployment directions.

13. The system of claim 10, wherein, when optimizing the deployment of the plurality of relay UAVs, the at least one processor device is further configured to:

determine a representative set of contraction points to be evaluated for a feasible orientation for routing based on an intersection of circles for each neighbor of the pair of the relay UAVs being contracted and whose radius corresponds to a maximum distance that supports traffic demand between the neighbor and the pair of the relay UAVs.

14. The system of claim 10, wherein the at least one processor device is further configured to:

implement an optimal process for fast backhaul re-configuration based on leveraging multiple layers of altitude to ensure that reconfiguration of a position and yaw of the plurality of relay UAVs is carried out in a minimum time while remaining collision-free.

15. The system of claim 14, wherein the at least one processor device is further configured to:

determine min-max bipartite matching assignment between old configuration positions and new configuration positions of the plurality of relay UAVs that minimizes a time taken to migrate to the new configuration positions.

16. A multi-unmanned aerial vehicle (UAV) wireless communication network, comprising:

a wireless backhaul network, wherein the wireless backhaul network is configured to be implemented by a plurality of relay UAVs and at least one application UAV, wherein the mobility for the at least one application UAV is determined based on application-specific objectives, and wherein the plurality of application UAVs are configured to wirelessly provide at least one application, wherein the mobility for the plurality of relay UAVs is determined based on forming and maintaining the wireless backhaul network, and wherein the plurality of relay UAVs are configured to connect the at least one application UAV to a ground station, and wherein a deployment of the plurality of relay UAVs is optimized angularly by:

contracting at least one of the plurality of relay UAVs with abundant radio capacity;

repositioning a remaining of the plurality of relay UAVs to efficiently utilize their available radio capacity across sessions while continuing to support a target traffic demand; and checking each pair of the relay UAVs that belong to different sessions whether the pair of the relay UAVs can be contracted and replaced by a single UAV in a new position and orientation, while supporting aggregate traffic belonging to the pair of the relay UAVs; and a wireless backhaul network access point configured to connect to the wireless backhaul network.

* * * * *